United States Patent
Salte et al.

[11] Patent Number: 5,132,120
[45] Date of Patent: Jul. 21, 1992

[54] FISH FEED

[75] Inventors: Ragnar Salte, Sogndal; Magny Thomassen; Kjell A. Rørvik, both of Oslo, all of Norway

[73] Assignee: Norsk Hydro a.s., Oslo, Norway

[21] Appl. No.: 704,966

[22] Filed: May 23, 1991

[30] Foreign Application Priority Data

May 23, 1990 [NO] Norway ................................. 902274

[51] Int. Cl.$^5$ ................................................ A23K 1/00
[52] U.S. Cl. ............................................ 426/2; 426/74; 426/601; 514/502; 514/560
[58] Field of Search ........................ 426/601, 2, 72, 74, 426/805, 643; 514/502, 560

[56] References Cited

U.S. PATENT DOCUMENTS

| | | | |
|---|---|---|---|
| 3,58,623 | 7/1969 | Raymond | 514/502 |
| 2,848,366 | 8/1958 | Bertsch et al. | 514/502 |
| 4,058,621 | 11/1977 | Hill | 514/502 |
| 4,067,994 | 1/1978 | Anderson et al. | 514/502 |
| 4,906,479 | 3/1990 | Kitagawa et al. | 426/2 |
| 4,960,795 | 10/1990 | Salte et al. | 426/2 |
| 4,975,290 | 12/1990 | Artz et al. | 426/74 |
| 4,994,283 | 2/1991 | Mehansho et al. | 514/502 |
| 5,012,761 | 5/1991 | Oh | 426/2 |

*Primary Examiner*—R. B. Penland
*Attorney, Agent, or Firm*—Wenderoth, Lind & Ponack

[57] ABSTRACT

Fish feed and method for obtaining prophylactic effect on diseases where the bio-available Fe is reduced below 150 mg/kg and where there is established a synergetic effect when the Fe is used in combination with EPA/DHA or other n-3 poly-unsaturated fatty acids or derviatives in amounts up to 8.5% or higher.

5 Claims, 6 Drawing Sheets

FIG. I

FISH FEED

The present invention relates to fish feed which gives increased growth and improved health.

The abundant access to marine raw materials in the form of fish meal and fish oil from herring and capeline has resulted in that Norvegian aquaculture industry to a great extent has employed such raw materials in their feed mixtures.

Due to this fact there has been utilised feed mixtures with a relatively high content of marine oils and long chain omega-3 poly-unsaturated fatty acids which have shown to be essential for marine organisms.

Such feed, which has a fat content which normally lies between 17 to 20 percent will contain an amount of omega-3 poly unsaturated fatty acids in amounts from 1.5–3 percent by weight, the content of these essential omega-3 poly unsaturated fatty acids in the fish oil will depend on time of the year and the area of catch.

Recent investigations have, however, shown that cultured fish in spite of being fed with feed having this relatively high content of marine fats, may have fragile cell membranes. The effects have been most prominent at low water temperatures. This has lead to the development of a new fish feed rich in fat having a higher proportion of n-3 poly unsaturated fatty acids as described in the applicants U.S. patent Ser. No. 07/276,854, (norvegian patent application no. 885670) and where there are employed preferred amounts of n-3 poly unsaturated fatty acids such as 5, 8, 11, 14, 17 eicosapentaenoic (EPA) and/or 4, 7, 10, 13, 16, 19 -docosaheksaenoic (DHA) or digestible derivatives of these (EPA/DHA) in amounts from 3.5–8% by weight or higher.

The fact that the EPA/DHA additions primarily have effect at low water temperatures and to a less extent at normal or higher water temperatures have lead to a new hypothesis put forward by the inventors; that there are other additives which will influence the biological system of the fish and which may obscure the effect of the EPA/DHA.

After an extensive prior screening it was decided to investigate the importance of the content of iron in the feed.

According to available sources it is recommended that the iron content of fish feed should be in an area of minimum 250 mg/kg feed, confer Watanabe: Nutrient requirements of cold water fishes, NO 16, National Academy Press, Washington D.C., 1981. An analysis of the available, commercial norwegian feed brands showed a very great variation of the iron content, varying from to 200 to 400 mg/kg. Norwegian feed brands will therefore on the average be within what has previously been recommended. It is therefore obvious that the content of iron has not been considered to be critical and that one has assumed that fish and other poikilothermic animals easily will be able to get rid of surplus iron.

However, iron is a potent oxidant for fat and fatty acids and the inventors have assumed that there could be an interaction between iron and EPA/DHA which may influence important biological mechanisms. Furthermore, iron per se is an important micro nutrient for fish patogenes and fish parasites.

Therefore feed tests were initiated with feed mixtures containing different amounts of iron and different amounts of EPA/DHA.

These tests have given convincing and consistent results as will be described below, and it can now be postulated that the amount of iron in the feed is critical and have great importance in many respects. Furthermore it has been found that there exists a direct interrelation between iron and EPA/DHA which influences basic biological mechanisms, whereby it is obtained a surprising synergistic effect when EPA/DHA and iron are present in the feed in defined proportions.

Thus it is an object of the present invention to provide a new and improved feed, where the amount of biologically available iron is adjusted to an optimal level.

A further object is to provide feed where the amounts of EPA/DHA and iron are interrelated and adjusted to obtain a synergetical effect in relation to improved energy utilisation, growth and health.

These objects and other advantages provided by the invention are obtained by means of the feed mixtures and the method which are defined in the accompanying patent claims 1–5.

A complete description of the invention and the performed experiments, which demonstrate the results obtained, will be given below with reference to the accompanying illustrations where FIG. 1 shows the development of winter ulcers (Y-axis) in populations of salmon which are fed with a EPA/DHA-rich feed and a feed to which only capeline oil is added and all having different levels of iron of approximate 100, 200, 300 and 400 mg/kg (X-axis).

FIG. 4 illustrates development of blood percentage (haematocrit) with an iron level of approximately 100 mg in the feed (against nr of weeks on test feed) and FIG. 4b illustrates the formation of hemoglobin with the same iron level, while

Figure 1:
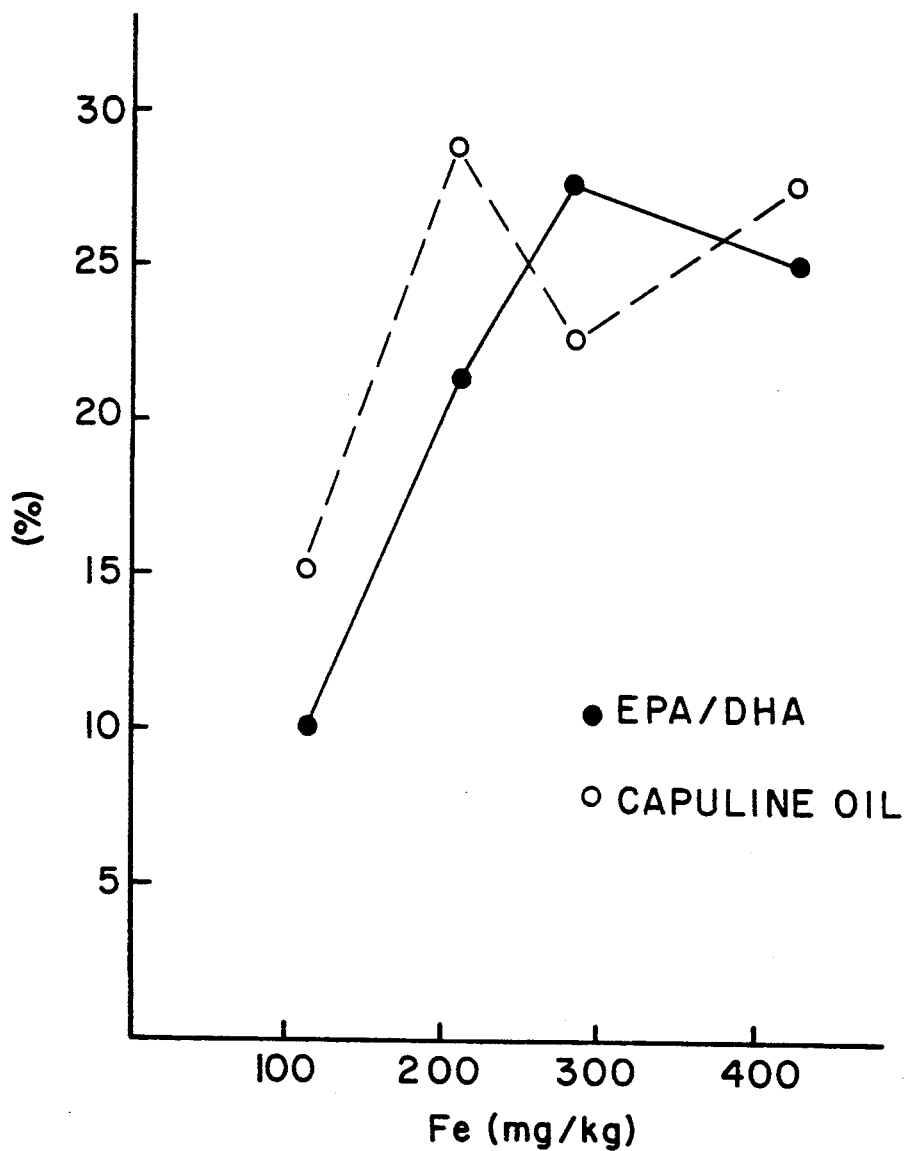

To carry out the feed tests there was used a standard feed mixture to which was added capeline oils such that the total amount of fat or lipid was approximately 18% and the amount of EPA/DHA was 2.9%. Furthermore a feed to which was added a EPA/DHA concentrate was used with the same total amount of fat and with the amount of EPA/DHA increased to 5.1%. The amount of iron in these feed mixtures was approximately 100, 200, 300 and 400 mg/kg dry feed. Totally 8 different feed mixtures were thus made. The amount in percentage of fat (lipid) was determined by chloroform/methanol extraction (J. Biol. Chem 1957 226:497–509).

The experiments were carried out with Atlantic salmon which was placed in the sea in separate netpens and the tests were running over a time period of 5 months (from Jan. to May). All together 16 netpens were employed, each containing 160 salmon with a starting weight of approximately 700 grs. Tests on selected species were carried out in week 5, 8, 11, 14 and 17, all together 5 tests and for each test 10 fish per net were selected.

EXPERIMENT 1

Effect of Test Feed on Winter Ulcers

The conation winter ulcers is used for surface wounds inflicted on the side of the fish at low sea temperatures.

There have been proposed different hypotheses about the causes for winter ulcers and these are including all sorts of theories from birds bites to bacteria attacks. The real cause is, however, still not known. Winter ulcers have great economical consequences, partly because the wounds give high mortality and especially because of downgrading of the fish from superior or ordinary quality to "production" quality.

Our hypothesis is that winter ulcers are caused by local blood clots (thrombi) in the skin of the fish, these again formed by red blood cells which are stick together because the blood contains more iron than the transport mechanisms (transferrin) can take care of.

The registrations were carried out at start of the experiments and after 3, 6, 9 and 12 weeks on test feed. 160 fish were selected each time. The proportion of fish with winter ulcers at the start of the experiment was 22.5% (36 fish). These were approximately evenly distributed among the test groups. During the test period it was a significant (one-way variance analysis (ANOVA), $F = 25495$, $df = 1 p < 0.005$) lower occurance of winter ulcers in the group which had the lowest amount of iron (120 mg/kg) (FIG. 1). It will appear from the illustration that the presence of EPA/DHA will tend to improve the positive effect of a low content of iron.

The above findings confirm our hypothesis and describe a simple solution of a very great economical problem for the fish breeding industry.

EXPERIMENT 2

Effect of Test Feed on Salmon Lice

Salmon lice is the most frequently occurring external parasite on norwegian cultured salmon. It attacks the parts of the skin which are without scales, whereby especially the head is exposed. The result will be extensive wound formations, and in certain cases the headbone will be exposed. Visible salmon lice damages will lead to downgrading of slaughtered fish. The problem has up to now being tried solved by treating the fish with organic phosphorous additives, something which is dubious both in relation to the environment and the consumers.

Figure 2:
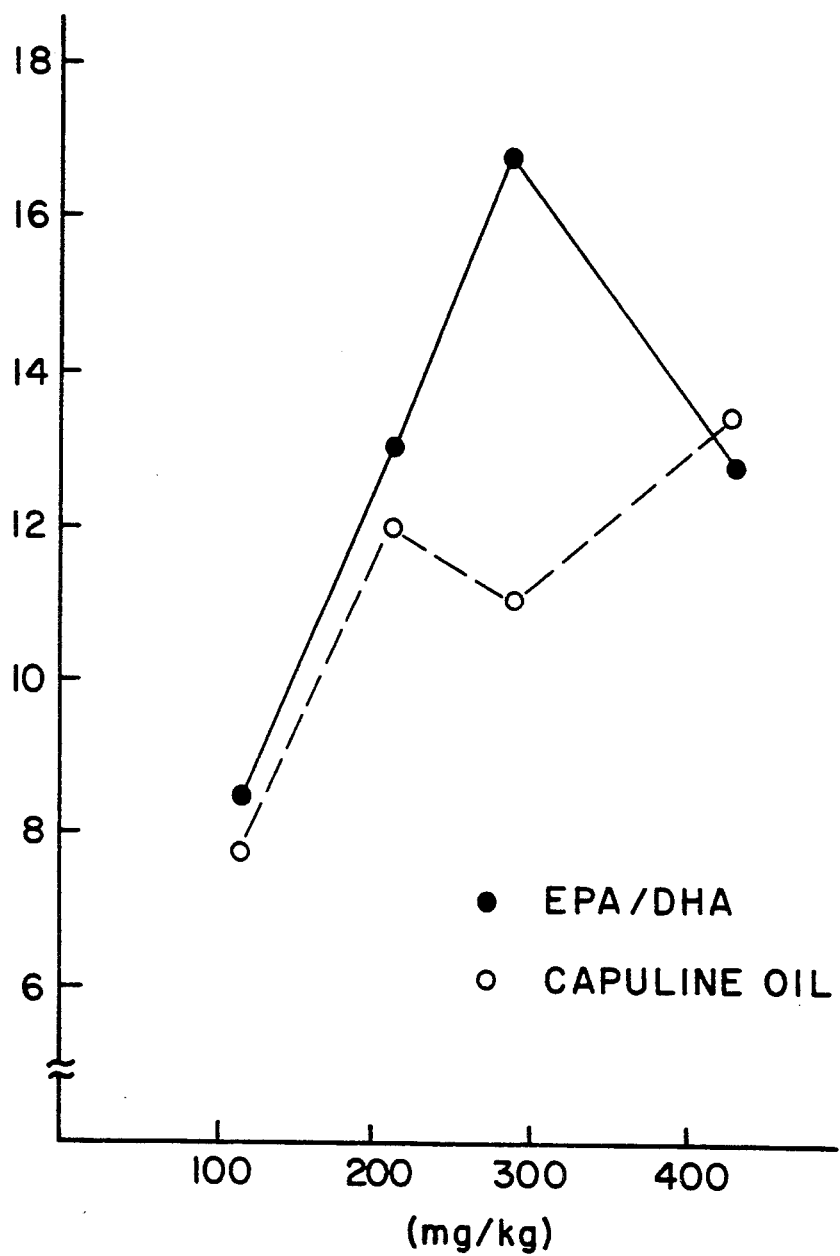
FIG. 2 illustrates the number of salmon lice per fish (Y-axis) for fish which are fed with the same feed mixtures (X-axis).

Because salmon lice are nurtured by blood and tissue liquid, it is safe to assume that iron is an important micro nutrient also for the lice. At one selection of fish after 12 weeks ($n = 160$ fish) on test feed, it was observed significant lower number of salmon lice (Lepeophteicus Salmonis, Krøyer) in those groups who were fed with the lowest amount of iron in the feed, FIG. 2 (one-way ANOVA, $F = 11.487$ $p < 0,05$), independent of the amount of EPA/DHA.

This strengthen our hypothesis that easy access to iron is beneficial for the parasites ability to breed.

EXPERIMENT 3

The Effect of Testfeed in Bacterial Tests

The bacterias require iron to be able to multiply and the must be able to multiply in an organism to cause a disease. Infectious deseases (f.e. furunkulosis) are frequently occuring in norwegian fish breeding. To study the relation between access to iron for the bacteria and disease in cultured salmon, *Vibrio anquillarum* was utilised as a marker bacteria. This bacterium will cause classical vibriosis.

Figure 3:
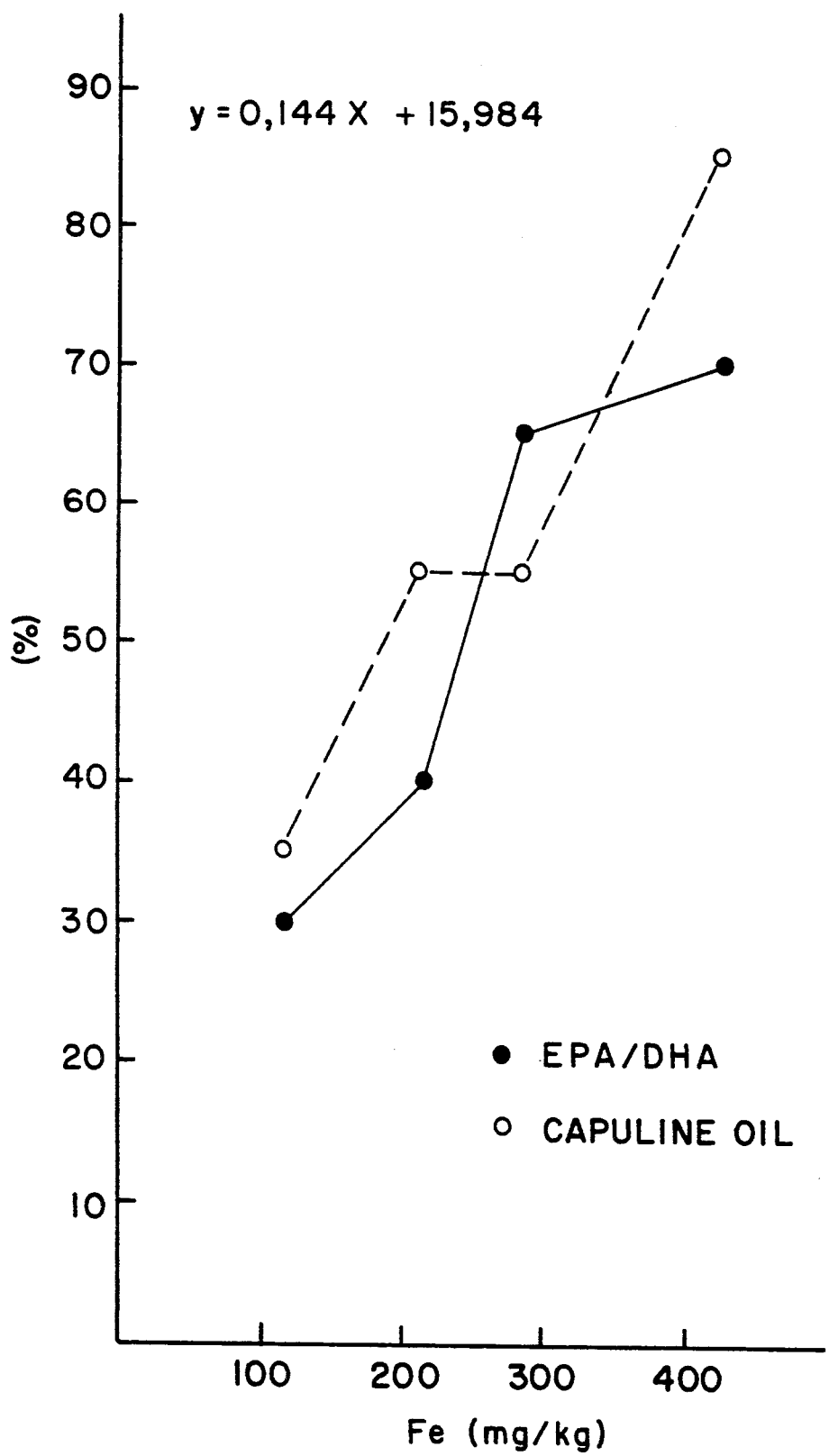
FIG. 3 shows the death rate in % (Y-axis) in salmon after infection with vibriosis.

The fish (20 from each test group—totally 160 fish) were groupmarked, (cutting of fins) and injected individually with a suspension of *Vibrio anquillarum*. The fish were thereafter placed in one and the same container (circular container 3 m in diameter, waterheigth 1 m) in iced water (0°–2° C.) until day 7, whereafter the temperature was raised to the sea temperature in the area (5° C.) in approximately 24 hours. The mortality, cause for mortality and the group connection of dead fish was registered daily. At approximately 50% mortality (16 days after infection) it was observed a significant linear correlation between mortality and amount of iron in the test feed as appears from FIG. 3 ($r = 0.938$ df $= 7$, $p < 0.001$).

This experiment shows that there is a consistent connection between amount of iron in the feed and the mortality after infection with vibriosis. The amount of available iron which is most benificial for the fish in this experiment (120 mg/kg feed) is therefore significantly lower than what has up to now been internationaly recommended (250–450 mg/kg).

EXPERIMENT 4

Figure 4A:
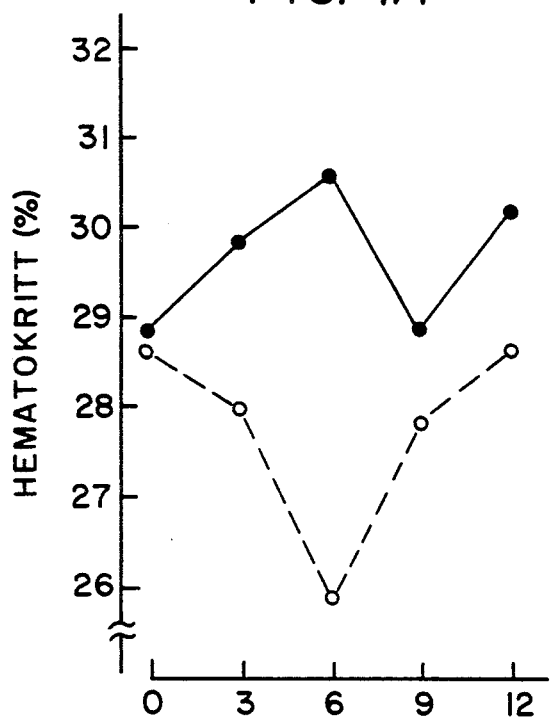

Effect on Blood Percentage (Hematocrit) and Hemoglobin Content in Red Blood Cells Hematocrit and hemoglobin content are both important for the ability of the blood to transport oxygene and hence the energy utilisation and thereby growth and vitality of the fish. Fish which were given the lowest content of iron in the feed (120 mg/kg) and to which simultaneously was added EPA/DHA contentrate (5.1% by weight) had significantly higher blood percentage than fish who had been given the same amount of iron, but only 2.9% of EPA/DHA in the form of capeline oil. FIG. 4a (ANOVA, $F = 10.569$, $df = 1$, $p < 0.005$).

Figure 4B:
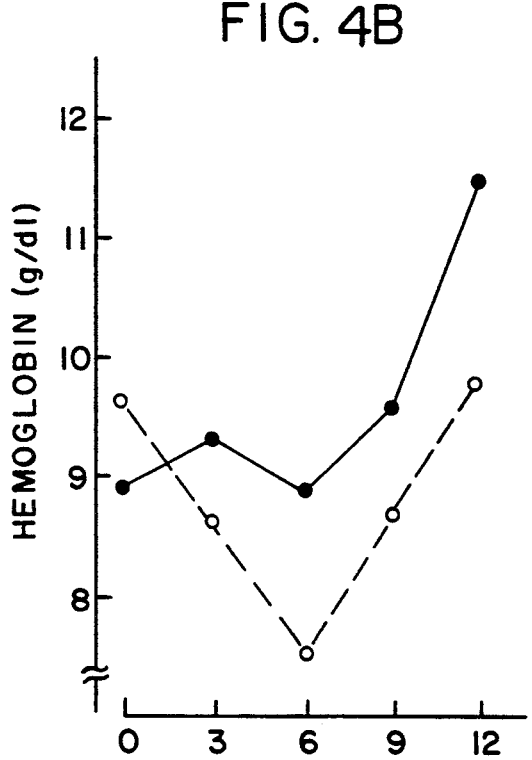
Figure 4C:
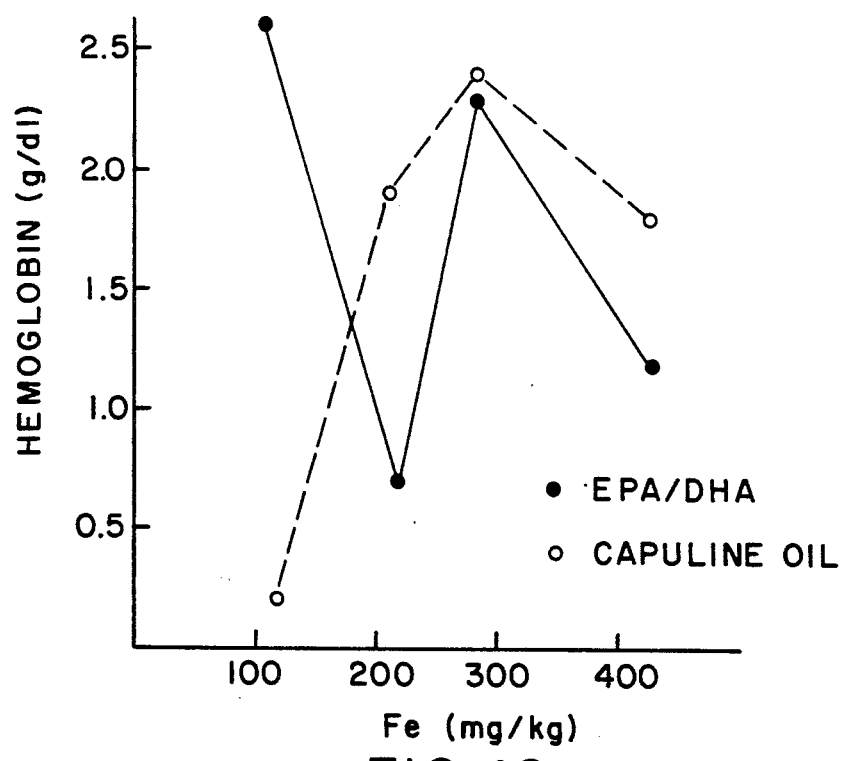
FIG. 4c illustrates the increase of hemoglobin from start until termination (after 12 weeks on test feed), with the different levels of iron.

The differences were observed after 3 weeks on the test feed and lasted for the rest of the test period. The hemoglobin content was influenced in the same way in the same fish, cf. FIG. 4b (paired t-test, $T = 5.158$, $df = 3$, $p < 0.005$). Simultaneously the hemoglobin content increased significantly from day 0 ($HB = 8.9$ g/dl) to the end of the test ($Hb = 11.5$ g/dl) in groups which were given EPA/DHA 4.4% and 120 mg iron/kg dry feed. This increase did not take place with the fish which were given capeline oil (9.6–9.8 g/dl). This is clearly shown in FIG. 4c which also is describing the increase in hemoglobin for the other test feeds.

Low iron content in the feed in addition to the increased amount of EPA/DHA has a clearly positive effect on the blood percentage and the hemoglobin content in the blood of salmon. This should therefore also give an improved energy utilisation and an improved growth such as it also appears from FIG. 6.

EXPERIMENT 5

Effect of Test Feed on Storage of Iron in the Liver

Figure 5:
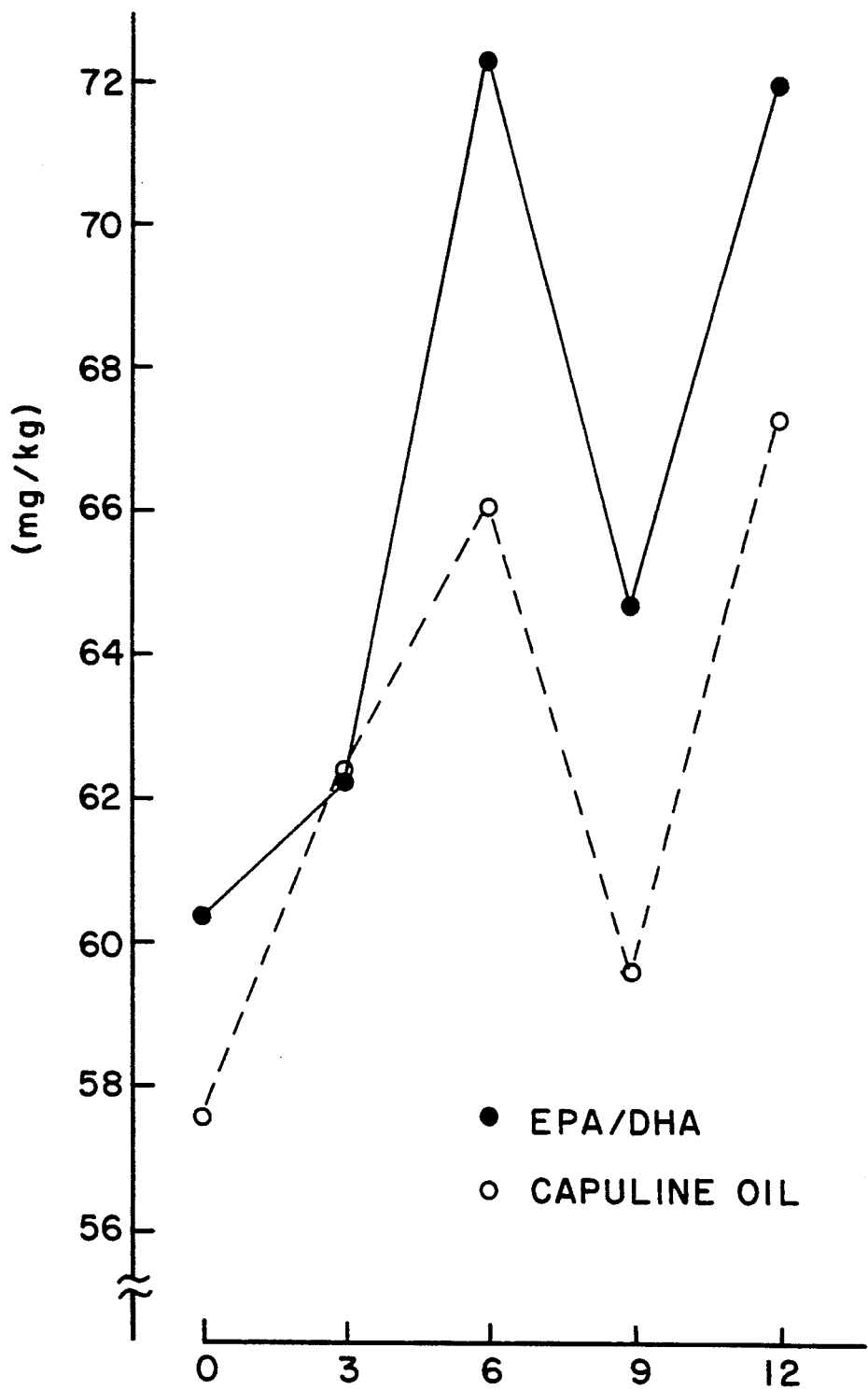
FIG. 5 illustrates the amount of iron in mg/kg (Y-axis) which is deposited in the liver (the liver is the natural iron depot of the fish) after zero to 12 weeks with the test feed and FIG. 6 illustrates the weight in grams (total weight) of the salmon (Y-axis) after 12 weeks on test feed with the different levels of iron (X-axis).

Iron is a major component of hemoglobin. It is therefore important for the fish to have a sufficient amount of iron stored in the liver. After 6 weeks on test feed the fish who were given EPA/DHA concentrate had a significantly higher iron storage in the liver than fish who were given capeline oil as fatty source, cf. FIG. 5 (paired t-test, T=11.163, df. 2, p<0.001). The decrease in stored iron which can be seen from 6-9 weeks, is explained by the treatment for salmon lice during this period.

EXPERIMENT 6

Effect of Test Feed on Growth

The average weight for the salmon at the start of the tests (Week 2—1990) was 690 gr (SD=+/−8 gr). During the 3 week long period of adaption it was observed a weight loss of approximately 40 gr in all the netpens. Such a weight loss is normal when fish from big netpens are transferred to smaller test netpens. The growth (all types of feed together) was otherwise normal during the whole testperiod.

---

Growth 0-3 weeks on testfeed: 0,37% per day; Temp.: 5,0° C.
Growth 3-6 weeks on testfeed: 0,44% per day; Temp.: 5,2° C.
Growth 6-9 weeks on testfeed: 0,53% per day; Temp.: 4,7° C.
Growth 9-12 weeks on testfeed: 0,59% per day; Temp.: 5,5° C.

---

Figure 6:
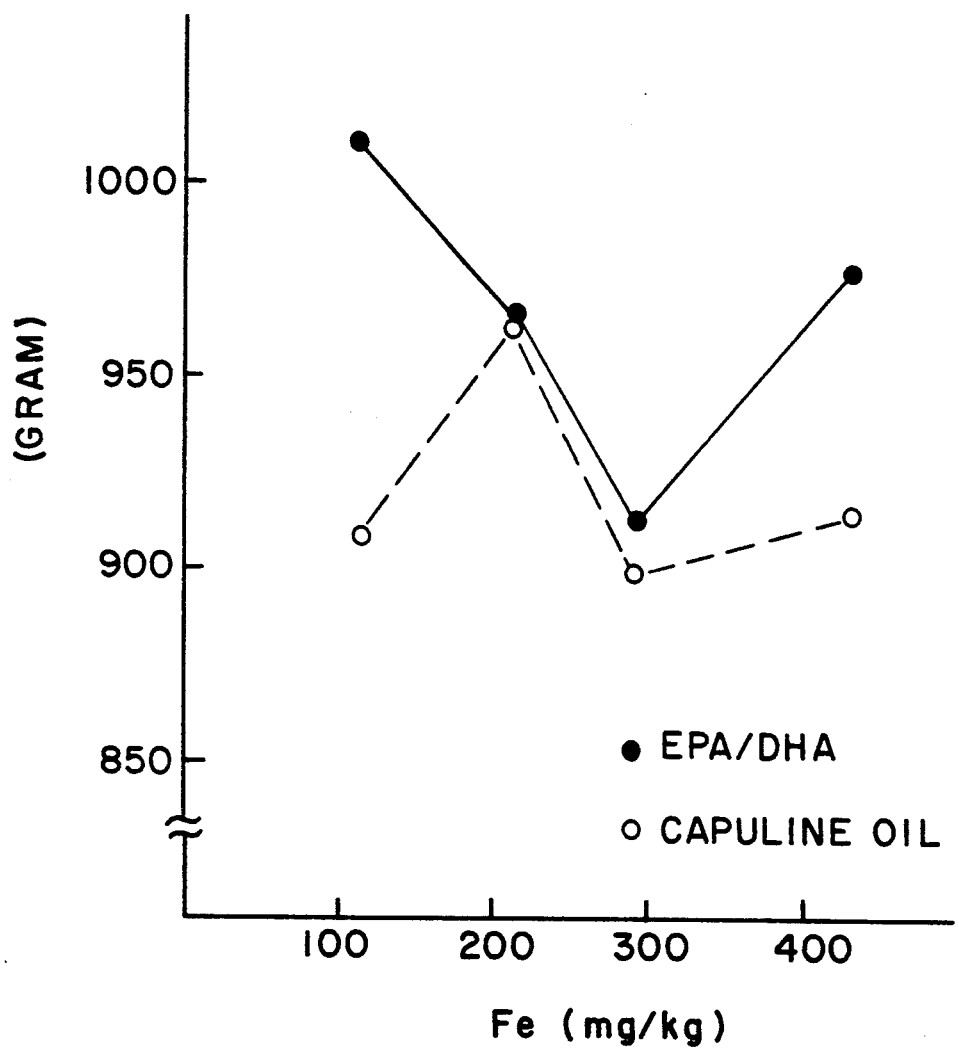

Significant differences in growth were observed after 12 weeks on testfeed (FIG. 6, n=20 per group). Salmon which had been given EPA/DHA and low iron (120 mg) exhibited the fastest growth rates, corresponding to approximately 0.6% per day during the whole testperiod of 12 weeks. This is very good in relation to the low sea temperatures. The growth rate of salmon who had been given 120 mg of iron and capeline oil was significantly lower (approx. 0.4% per day).

The observed increase in growth for the low iron feed with EPA/DHA addition, but not with capeline oil addition, can be explained by a synergistic effect of iron and EPA/DHA. This effect causes increased bio-availability of the iron (measured as increased bloodpercentage, hemoglobin and stored iron). The bio-availability of the iron is therefore not only dependent on the amount of iron in the feed but also on the EPA/DHA concentration in the feed.

From the described tests and illustrations which are referred to above, it will clearly appear that the level of iron in the feed which today is used for cultured fish is far too high, and that this will both increase the risc for desease and will reduce the growth. It appears also that even the lowest testlevel above (120 mg/kg feed) is too high. We have therefore conducted additional feed tests with testlevels of Fe substantially lower than 120 mg/kg feed and analysed the amount of Fe in the blood plasma from 0-7 weeks. Combined with suitable amounts of EPA/DHA the amount of Fe in the blood plasma was continously and satisfactory high and we are therefore today not able to quote the minimum amount of Fe in the feed. It may be as low as 10 mg or even lower. If the iron level of the feed is to be further reduced, however, the bio-availability of the iron has to be increased. This can be obtained through the increase of the content of EPA/DHA in the feed.

From the above described tests a clear synergy effect between increased EPA/DHA and low iron in the feed, is evident.

It is therefore established that the amount of biologically available iron in the feed and the general iron requirement should be (lower than in an area from 150 mg/kg and thus) substantially lower than what has up to now been recommended used. In addition EPA/DHA will increase the bio-availability of iron so that increasing amounts of EPA/DHA in the feed gives a possibility for further reduction of the amount of iron.

With high amounts of EPA/DHA (above 3.5%) and lower amounts of iron (below 120 mg) there is probably obtained an even more pronounced synergy effect which will result in additionally improved health status, and increased growth.

The Optimal levels of iron is estimated to be anywhere between 5 mg to 150 mg when the EPA/DHA content varies from 8.5%-2.0%. The EPA/DHA or other 1-3 poly-unsaturated acids can be present in the form of free acids and digestible derivatives while the iron has to be biological-available. Examples of bio-available iron are iron-sulfate, iron-fumarate and hemiron.

The use of the feed is not per se limited to fish but also to other poikilothermic organisms, marine species as well as species living in fresh water. It is suitable as a start feed as well as a feed for grown fish.

We claim:

1. In a fish feed which contains proteins, lipids and carbohydrates in combination with one or more additional components selected from the group consisting of fillers, adhesives, preservatives, vitamins and minerals mixed together to make a dry, soft or wet feed; the improvement wherein the content of biological available iron in the feed is not more than 150 mg per kg feed on the basis of the dry matter content of the feed and wherein the feed contains at least 2.0% by weight of n-3 poly unsaturated fatty acids or digestible derivatives of the fatty acids, higher amounts of iron requiring lower amounts of EPA/DHA in the feed and vice versa.

2. The improvement according to claim 1, wherein the feed contains n-3 polyunsaturated, marine fatty acids or digestible derivatives of fatty acids in amounts of 2.0-8.5% by weight; the amount of biologically available iron varying from 5-150 mg.

3. The improvement according to claim 1, wherein the fish feed contains less than 100 mg iron and more than 3.5% by weight of n-3 polyunsaturated fatty acids or fatty acid derivatives.

4. A method of obtaining a prophylactic effect of diseases and improved health and growth for fish which comprises feeding fish with feed which contains n-3 poly unsatuarated fatty acids or fatty acid derivatives, said feed being such that the proportions of n-3 fatty acids is increased to amounts of at least 2.0% by weight and the amount of biologically available iron is reduced below 150 mg/kg.

5. A method of obtaining a prophylactic effect of diseases and improved health and growth for fish, which comprises feeding fish with feed which contains n-3 poly-unsaturated fatty acids and iron according to claim 4, wherein the feed contains from 2.0%-8.5% of EPA/DHA and where the biologically available iron content is varied from 5 mg/kg-150 mg/kg on the basis of the dry matter content of the feed.

* * * * *

UNITED STATES PATENT AND TRADEMARK OFFICE
CERTIFICATE OF CORRECTION

PATENT NO. : 5,132,120

DATED : July 21, 1992

INVENTOR(S) : Ragnar SALTE et al.

It is certified that error appears in the above-identified patent and that said Letters Patent is hereby corrected as shown below:

Figures 1, 2, 3, 4c, 5 and 6, "Capuline Oil" should read --Capeline Oil--.

Figure 4a, "HEMATOKRITT" should read --HEMATOCRIT--.

Column 3, lines 2 and 24, "selected" should read --sampled--;
         line 26, "225%" should read --22,5%--;
         line 43, "norwegian" should read --Norwegian--;
         line 54, "selection" should read --sampling--.

Column 4, line 1, "desease" should read --disease--;
         line 2, "norwegian" should read --Norwegian--;
         line 34, "oxygene" should read --oxygen--;
         line 38, "contentrate" should read --concentrate--;
         line 52, "4,4%" should read 5,1%--.

Column 5, line 48, "desease" should read --disease--.

Column 6, line 9, "3,5%" should read --5,1%--;
         line 17, "1-3 poly-unsaturated acids" should read --n-3 poly-unsaturated acids--.

Signed and Sealed this

Fifth Day of October, 1993

Attest:

BRUCE LEHMAN

Attesting Officer

Commissioner of Patents and Trademarks